(12) United States Patent
Kläber

(10) Patent No.: US 9,744,721 B2
(45) Date of Patent: Aug. 29, 2017

(54) KITCHEN APPLIANCE ESPECIALLY A FOOD PRINTER

(75) Inventor: Nico Kläber, Köln (DE)

(73) Assignee: Aktiebolaget Electrolux, Stockholm (SE)

( * ) Notice: Subject to any disclaimer, the term of this patent is extended or adjusted under 35 U.S.C. 154(b) by 704 days.

(21) Appl. No.: 13/380,766

(22) PCT Filed: Jun. 24, 2010

(86) PCT No.: PCT/SE2010/000183
§ 371 (c)(1),
(2), (4) Date: Mar. 9, 2012

(87) PCT Pub. No.: WO2010/151202
PCT Pub. Date: Dec. 29, 2010

(65) Prior Publication Data
US 2012/0168985 A1    Jul. 5, 2012

(30) Foreign Application Priority Data
Jun. 24, 2009 (SE) ...................................... 0900860

(51) Int. Cl.
*A23P 20/10* (2016.01)
*B29C 67/00* (2017.01)
(Continued)

(52) U.S. Cl.
CPC .......... *B29C 67/0059* (2013.01); *A23P 30/00* (2016.08); *A23P 30/10* (2016.08); *B41J 3/36* (2013.01); *B41J 3/407* (2013.01); *A21C 15/002* (2013.01); *A21C 15/005* (2013.01); *A23P 2020/253* (2016.08); *B29C 47/92* (2013.01); *B29C 67/0051* (2013.01); *B29C 67/0055* (2013.01); *B29C 2947/92152* (2013.01); *B29C 2947/92647* (2013.01); *B41J 3/4073* (2013.01)

(58) Field of Classification Search
CPC ...... A23P 2001/089; A23P 1/10; A23P 30/00; A23P 30/10; A23P 2020/253; B29C 67/0051; B29C 67/0055; B29C 67/0059; B29C 67/0069; B29C 47/92; B29C 2947/92152; B29C 2947/92144; B29C 2947/92647; B41J 3/36; B41J 3/4073; B41J 3/407; A21C 15/002; A21C 15/005
USPC ............ 425/375, 174.4, 140, 141, 145, 225; 700/118, 119
See application file for complete search history.

(56) References Cited

U.S. PATENT DOCUMENTS 3,533,374 A * 10/1970 Luescher ................ A23G 1/18
118/20
4,910,661 A * 3/1990 Barth et al. ..................... 700/66
(Continued)

OTHER PUBLICATIONS

International Search Report for PCT/SE2010/000183, 3 sheets, dated Oct. 29, 2010.

*Primary Examiner* — Seyed Masoud Malekzadeh
(74) *Attorney, Agent, or Firm* — Banner & Witcoff, Ltd.

(57) ABSTRACT

The invention relates to a kitchen appliance, especially a food printer, and a method for printing food in 2- or 3-dimensional shapes. The food printer for making 2- or 3-dimensional shapes comprising a housing, an opening for printable food and binder, a control unit, and a printer head, wherein the printer head prints small drops of the printable food and the binder while moving to build the 2- or 3-dimensional shape.

17 Claims, 5 Drawing Sheets

(51) Int. Cl.
   *B41J 3/36*   (2006.01)
   *A23P 30/10*  (2016.01)
   *A23P 30/00*  (2016.01)
   *A21C 15/00*  (2006.01)
   *B41J 3/407*  (2006.01)
   *B29C 47/92*  (2006.01)
   *A23P 20/25*  (2016.01)

(56) References Cited

U.S. PATENT DOCUMENTS

| | | | | |
|---|---|---|---|---|
| 5,505,775 A * | 4/1996 | Kitos | | 118/14 |
| 5,764,521 A * | 6/1998 | Batchelder | | B29C 41/36 156/244.21 |
| 6,129,872 A * | 10/2000 | Jang | | 264/75 |
| 6,280,784 B1 * | 8/2001 | Yang et al. | | 426/231 |
| 6,280,785 B1 | 8/2001 | Yang et al. | | |
| 6,319,530 B1 * | 11/2001 | Stewart | | 426/383 |
| 6,367,791 B1 * | 4/2002 | Calderon | | B29C 47/0014 269/291 |
| 6,582,742 B2 * | 6/2003 | Stewart | | 426/383 |
| 6,629,011 B1 * | 9/2003 | Calderon | | B29C 67/0055 264/401 |
| 6,874,419 B2 * | 4/2005 | Harris et al. | | 101/483 |
| 7,089,860 B2 * | 8/2006 | Harris et al. | | 101/483 |
| 7,128,938 B2 * | 10/2006 | Stewart | | 426/383 |
| 7,270,528 B2 * | 9/2007 | Sherwood | | 425/174.4 |
| 7,452,196 B2 * | 11/2008 | Khoshnevis | | 425/64 |
| 7,625,198 B2 * | 12/2009 | Lipson et al. | | 425/174 |
| 7,641,461 B2 * | 1/2010 | Khoshnevis | | 425/60 |
| 8,109,606 B2 * | 2/2012 | Moynihan et al. | | 347/43 |
| 2001/0005522 A1 * | 6/2001 | Stewart | | 426/383 |
| 2003/0198719 A1 * | 10/2003 | Stewart | | 426/383 |
| 2003/0209836 A1 * | 11/2003 | Sherwood | | 264/401 |
| 2004/0021757 A1 | 2/2004 | Shastry et al. | | |
| 2004/0031410 A1 * | 2/2004 | Harris et al. | | 101/483 |
| 2004/0175463 A1 | 9/2004 | Shastry et al. | | |
| 2005/0139112 A1 * | 6/2005 | Harris et al. | | 101/483 |
| 2005/0157148 A1 * | 7/2005 | Baker et al. | | 347/106 |
| 2005/0195229 A1 * | 9/2005 | Barss | | 347/14 |
| 2005/0226975 A1 * | 10/2005 | Drouillard | | 426/383 |
| 2007/0222830 A1 * | 9/2007 | Moynihan et al. | | 347/85 |
| 2007/0231434 A1 | 10/2007 | Ream et al. | | |
| 2008/0158279 A1 * | 7/2008 | Barss | | 347/14 |
| 2008/0260918 A1 | 10/2008 | Lai et al. | | |
| 2009/0321979 A1 * | 12/2009 | Hiraide | | 264/113 |

* cited by examiner

KITCHEN APPLIANCE ESPECIALLY A FOOD PRINTER

This application is a national stage application of PCT application PCT/SE2010/000183 filed Jun. 24, 2010. The disclosure of this application is expressly incorporated herein by reference in its entirety.

FIELD OF INVENTION

The invention relates to a kitchen appliance, especially a food printer, and a method for printing food in 2- or 3-dimensional shapes.

TECHNICAL BACKGROUND

The technical area is a combination of science and cooking. The invention is inspired by chefs who painstakingly and scientifically experiment with food to surprise the guests and provoke innovative ideas of cooking.

Through books and tv-shows more and more chefs and private cooks are interested in molecular cooking. The main effects that molecular cooks use for their meals are experimental combinations, surprising transformations, a very aesthetical way of presenting the meal and the play with the eater's expectation of look, taste, smell and texture of food. However, the preparation of the mostly tiny and filigree food pieces is difficult, needs a lot of experience and is time-consuming

SUMMARY OF THE INVENTION

Today there are very much an experimental approach to molecular cooking. Even after a long time of molecular cuisine, it is still an exclusive game for specialists. One object of the invention is to bring some of the fantastic possibilities and ideas of molecular cooking to all ambitious cooks with an easy to use and affordable kitchen appliance. Another object of the invention is to provide a Computer Numerical Control (CNC) food printer for molecular cooking effects and decoration.

The invention discloses a kitchen appliance that offers several new possibilities to professional chefs as well as home users. The invention uses a layer-by-layer printing technique that arranges small particles or drops from a set of ingredients. Within minutes, it prints out three-dimensional desserts, complex structures, shapes for molecular dishes, and patterns for decorating a meal. In an easy way the user insert a blister pack comprising the necessary ingredients into the opening of the appliance. Place the appliance on top of a plate, and press the start button. Users can also create their own recipes with special software and their own ingredients.

Ambitious users can download recipes and share them with other users in an online community.

BRIEF DESCRIPTION OF THE DRAWINGS

The device will now be described in more detail in relation to the following figures.

DETAILED DESCRIPTION OF THE INVENTION

Figure 1:
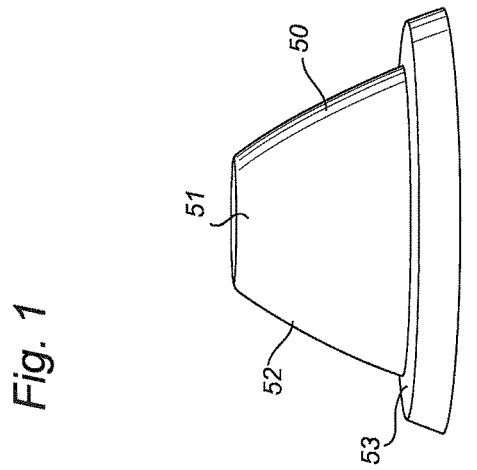
FIG. 1 shows the kitchen appliance according to the invention
Figure 1:
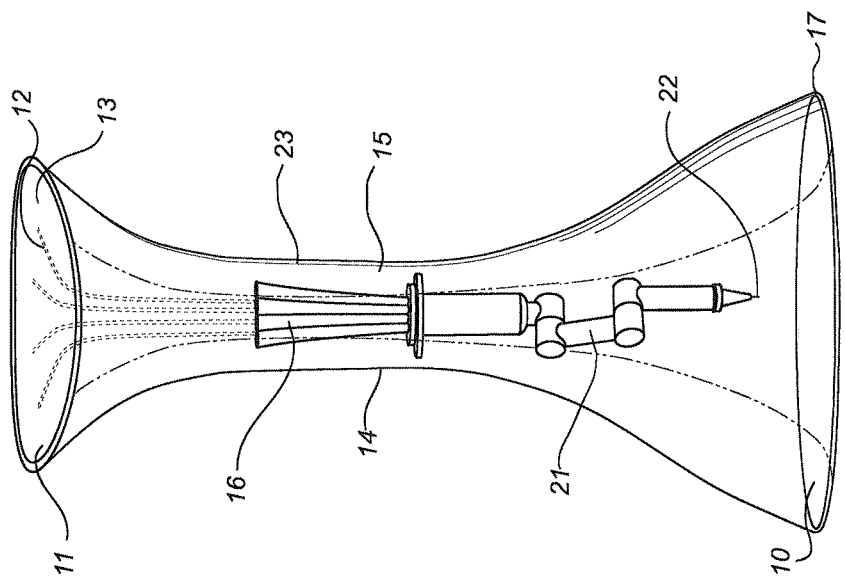

In FIG. 1 a kitchen appliance, especially a food printer (1) according to the invention is shown. The food printer (1) comprises a housing (10) with an opening (11) for printable food and binder. The housing also comprises an interface, in FIG. 1 shown as a touch display (12), preferably an OLED display. Close to the opening there is also a RFID scanner (13) for identifying the printable food and the receipt if food with RFID tags are used.

The housing (10) also comprises at least one reservoir, preferably more, for the different kinds of printable food that is used, and at least one reservoir, preferably at least two, for the binder. In the embodiment shown in FIG. 1 several reservoir are shown in the form of pipes (16). All the reservoirs are connected to the printer arm (21) and the printer head (22). The reservoirs are filled with printable food and binder through the opening (11).

The housing (10) also comprises a printer arm (21) with a printer head (22), control unit (23), battery (14) and/or a power connection (not shown). The food printer also comprises a network connection, preferably a Wi-Fi connection (15) to the internet for downloading receipt or program updates. The printer head (22), printer arm (21) and control unit (23) is part of a Computer Numerical Control (CNC) food printer.

The control unit (23) controls the movement of the printer arm and head as well as controlling what kind of drop the printer head should produce in every moment to create the decided shape or form.

For cleaning and charging the housing (10) is connected to a base unit (50). The base unit comprises a cleaning system (51) for cleaning the printer head (22), power supply (52), and contacts (53) for recharging the batteries (14) in the housing (10).

Figure 2:
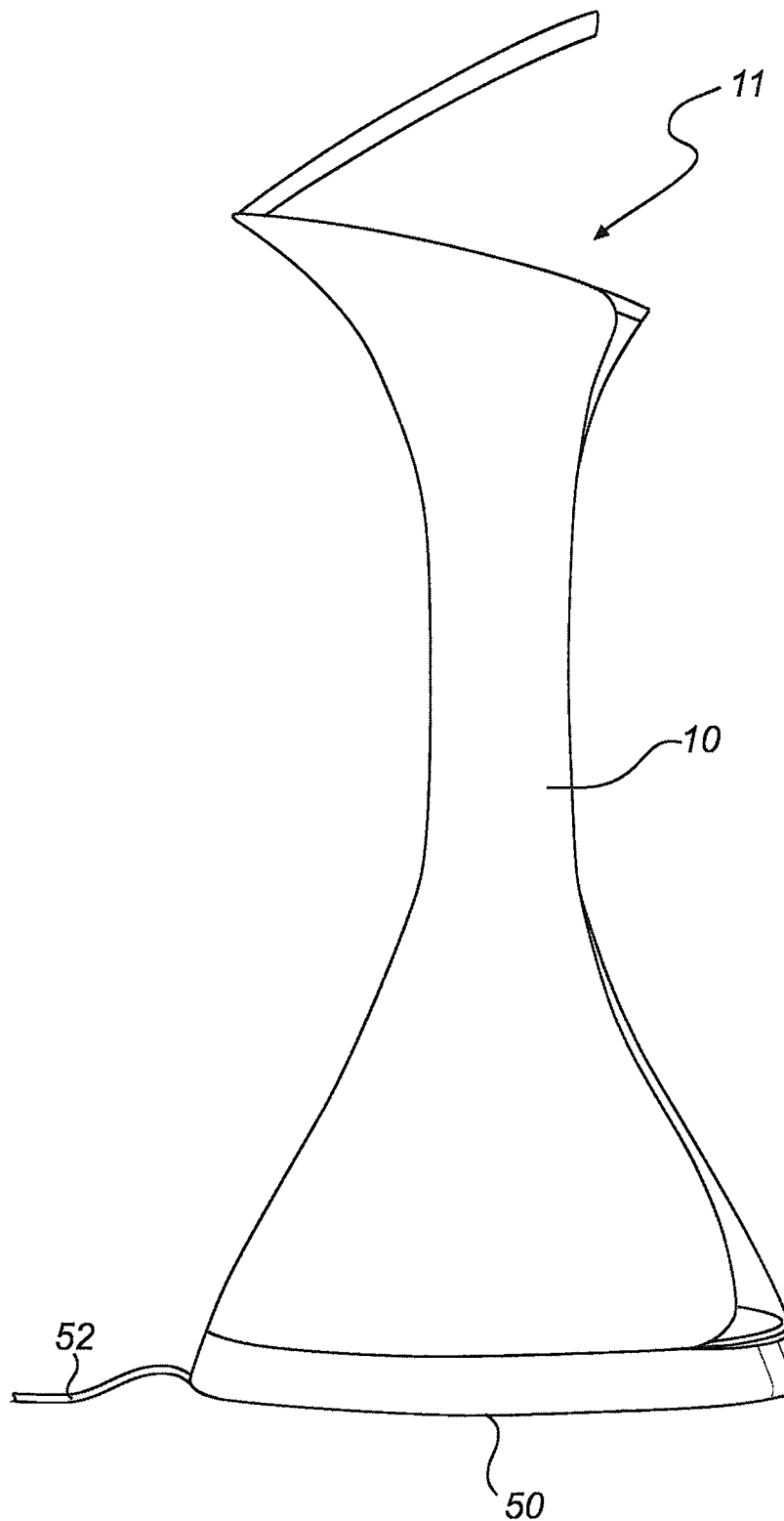
FIG. 2 shows the kitchen appliance according to the invention

FIG. 2 shows the housing (10) connected to the base unit (50). This could be done for charging the batteries (14), cleaning the printer head (22), or for storing.

Figure 3:
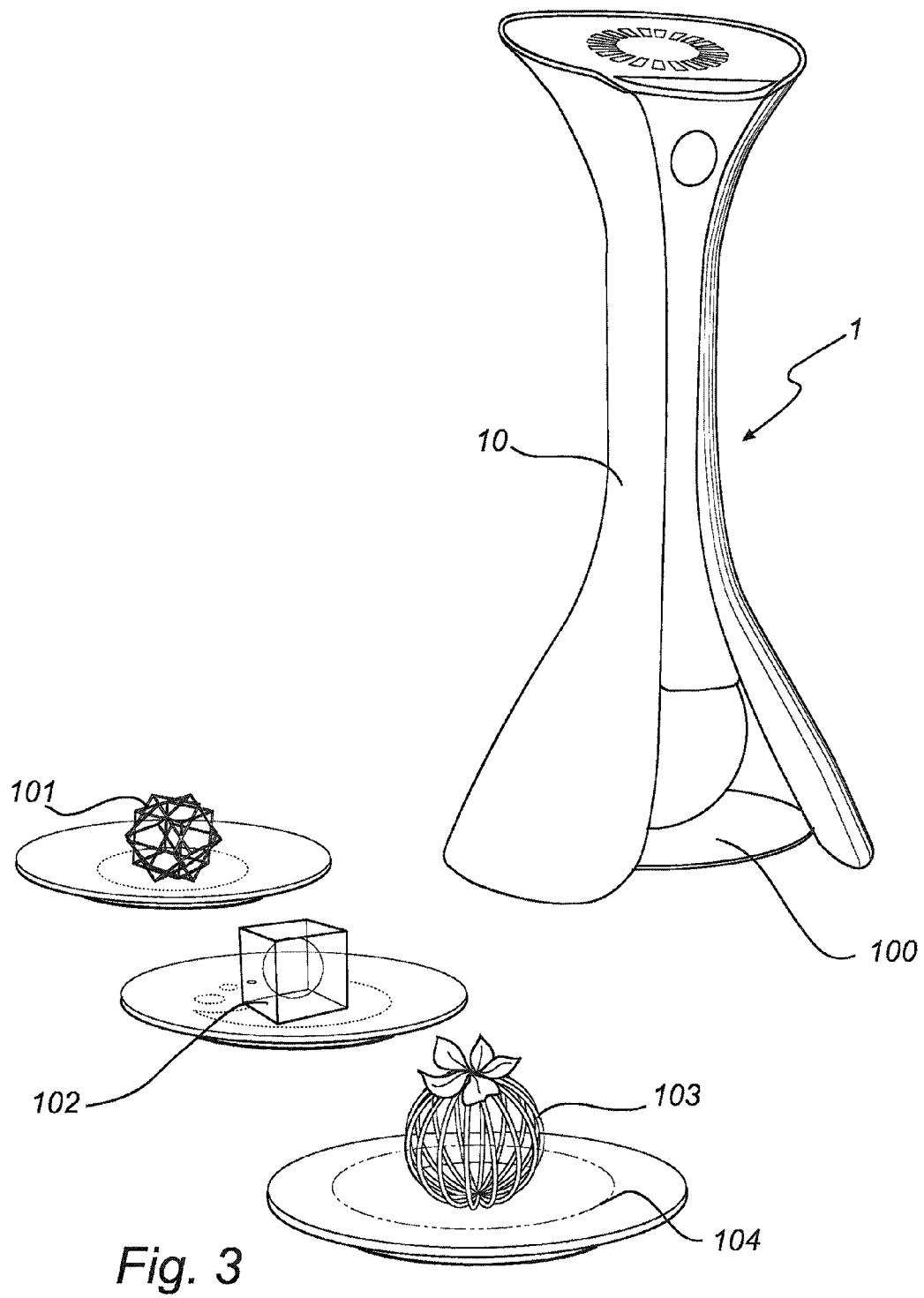
FIG. 3 shows the kitchen appliance during use
Figure 3A:
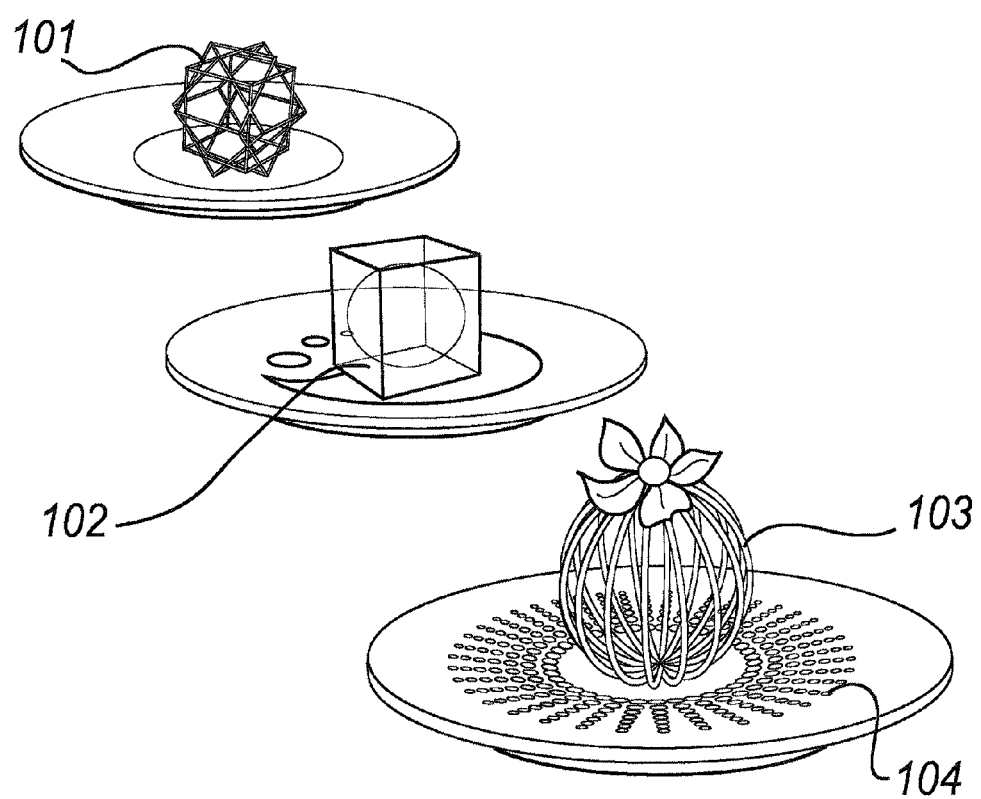
FIG. 3a shows a close up of printed food

FIG. 3 shows the food printer in use. The housing is disconnected from the base unit and arranged over a plate (100) on which the food is printed. Next to the food printer (close up in FIG. 3a) there are plates (100) with different kinds of printed food, e.g. printed food with a 3D-structure (101), printed food with enclosures (102), printed food with textures (103), and a food printed as a 3D pattern (104).

Figure 4:
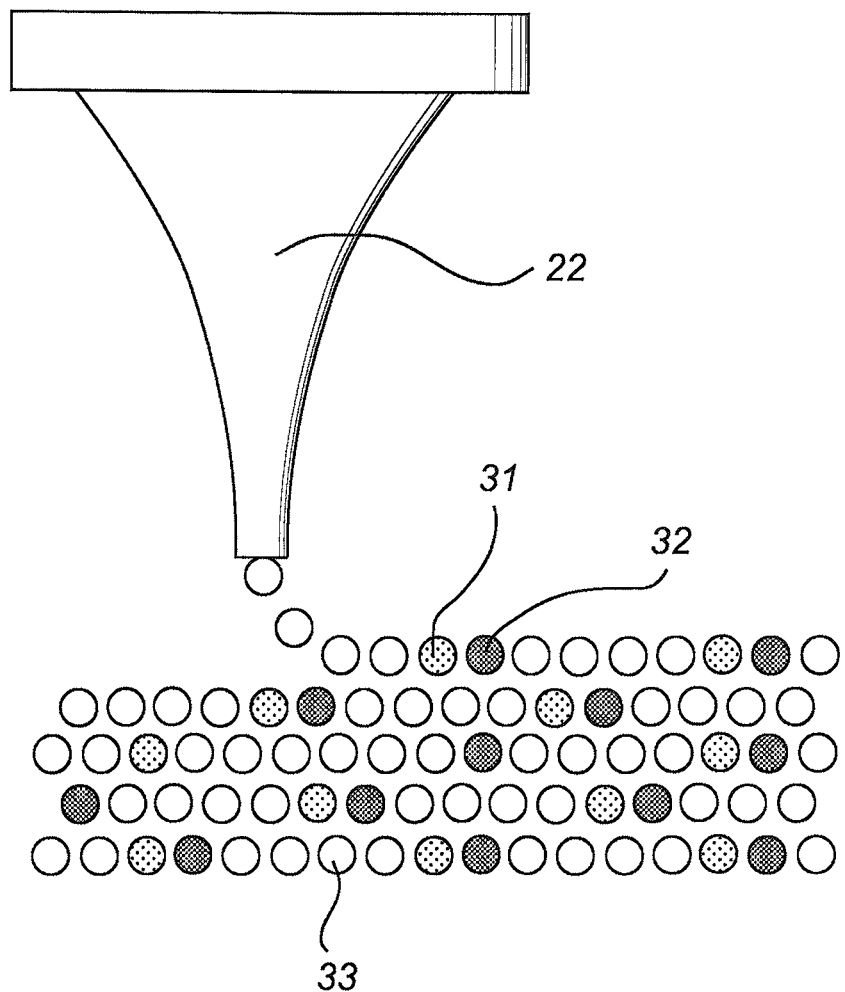
FIG. 4 shows the layer-by-layer principle

In FIG. 4 the method of printing food is schematically shown. The printer head (22) prints a small drop (31, 32, 33) of the printable food or binder from the reservoirs. The small drops, one by one leaves the printer head (22) at the same time as the printer head moves. In this way layers on layers can be created and a 3-dimensional shape (or 2 dimensional shape) is built. The amount, spreading and ration between the binder and the printable food at the time, controls the level of stableness of the printed food.

Most kinds of food is possible to us as printable food as long as it is possible to have it in a form suitable to be printed by a printer head, e.g. preferably in a liquid state or close to a liquid state, like gel. As binder gelatine, gluten or sugar can be used. In the embodiment shown alginic acid, a substance extracted from brown algae, in combination with calcium is used. Alginic acid is used in cooking today and is preferred for its simple and abrupt gelation in contact with calcium. In FIG. 2 the use of aginic acid (31), calcium (32) and food (33) is shown.

The amount, the spreading and the ratio between algin, calcium and the main substance printed at the time, controls the level of stableness of the printed food. It is possible to use different kinds of printable food at the same time.

The housing (10) is primarily made of polycarbonate. The material is applied in three different variations, each providing the right characteristics for the different parts. Transparent polycarbonate is used for the window, black tinted for the lid/display, and white for the body. The robotic printer arm and head is made from aluminum. A blue (O)LED backlight accentuates the processes inside the printer.

The invention is a handy CNC food printer for kitchens from professional to domestic. It autonomously prepares basic and otherwise difficult to create 2- and 3-dimensional parts of meals. It works with a layer-by-layer printing process out of small particles from diverse ingredients.

For beginners and for easy usability of the invention some basic printable food is preferably available in blister packs from the supermarkets. The blister pack comprises the exact amount of ingredients needed and the digital printing instructions, the recipe, for the printer. This is preferably provided in the form of an RFID-chip on the blister pack. For advanced users there is also the possibility to create own recipes or download from other professional users, user groups, or food manufacturers.

The invention relates to a kitchen appliance, especially a food printer for making 2- or 3-dimensional shapes comprising a housing (10), an opening (11) for printable food (33) and binder (31, 32), a control unit (23), and a printer head (22), wherein the printer head (22) prints small drops of the printable food (33) and the binder (31, 32) while moving to build the 2- or 3-dimensional shape. The stableness of the printed food is controlled by the amount, spreading and/or the ration between the binder (31,32) and the food (33). The housing comprises at least one reservoir for printable food, and at least one reservoir for the binder. Alginic acid and calcium is used as binder. The housing comprises an interface, preferably comprising a touch screen (12). The housing comprises a rechargeable battery (14) and preferably contacts (16) to recharge the battery. The kitchen appliance comprises a base unit (50) comprising power supply (52) and contacts (53) suitable for connecting with the contacts (16) in the housing for recharging the battery (14). The base unit (50) comprising a cleaning system (51) for cleaning the printer head (22). The printer head (22) and control unit (23) is part of a CNC printer. The invention also relates to a method for making 3-dimensional food, comprising the steps of: arranging printable food (33) in a reservoir; arranging a binder (31,32) in a reservoir; having a printer head (22) producing drops of printable food (33) and binder (31, 32); moving the printer head (22) after each drop; having a control unit (14) controlling the movement of the printer head (22); having a control unit (14) controlling the ratio of printable food drops and binder drops.

The invention uses various edible ingredients and them combine and print them in a desired shape and consistency, in much the same way as stereolithograpic printer create 3-dimensional representations.

The invention claimed is:

1. A food printer for making 2- or 3-dimentional shapes comprising:
   a housing comprising an opening for receiving printable food and binder;
   wherein the housing contains within:
   at least one reservoir for the printable food and at least one reservoir for the binder;
   a control unit;
   a movable printer arm with a printer head connected to a lower end of the printer arm, wherein the reservoirs are connected to an upper end of the printer arm, and the printer head is a single orifice printer head, said single orifice configured for printing a drop of the printable food or the binder,
   wherein the movable printer arm is configured to move the printer head in three dimensions and the printer head is configured to print drops of the printable food and the binder one-by-one while moving to build the 2- or 3-dimentional shape,
   wherein the printer head is configured to print both the drops of the printable food and the binder from the single orifice of the printer head, and
   wherein the housing includes a narrowed central body portion and a widened bottom portion, and the printer arm moves the printer head within the widened bottom portion of the housing to position the printer head for depositing the drops of the printable food and the binder.

2. The food printer according to claim 1, wherein a stableness of the printed food is controlled by an amount of the binder and the printable food, a spreading of the binder and the printable food, and/or a ratio between the binder and the printable food.

3. The food printer according to claim 1, wherein alginic acid and calcium is used as the binder.

4. The food printer according to claim 1, wherein the housing comprises an interface including a touch screen.

5. The food printer according to claim 1, wherein the housing comprises a rechargeable battery and contacts to recharge the rechargeable battery.

6. The food printer according to claim 5 further comprising a base unit comprising a power supply and contacts suitable for connecting with the contacts in the housing for recharging the rechargeable battery.

7. The food printer according to claim 6, wherein the base unit comprises a cleaning system for cleaning the printer head.

8. The food printer according to claim 2, wherein the printer head and the control unit is part of a CNC printer.

9. A food printer for making 2- or 3-dimentional shapes comprising:
   a housing comprising an opening for receiving the printable food and the binder:
   wherein the housing contains within:
   at least one reservoir for the printable food and at least one reservoir for the binder;
   a control unit; and
   a movable printer arm with a printer head connected to a lower end of the printer arm, wherein the at least one reservoir for the printable food and the binder are connected to an upper end of the printer arm, and the printer head is a single orifice printer head, said orifice configured for printing a drop of the printable food or the binder,
   wherein the movable printer arm is configured to move the printer head in three dimensions and the printer head is configured to print drops of the printable food and the binder one-by-one while moving to build the 2- or 3-dimentional shape,
   wherein alginic acid and calcium is used as the binder,
   wherein the printer head is configured to print both the drops of the printable food and the binder from the single orifice of the printer head, and
   wherein the housing includes a narrowed central body portion and a widened bottom portion, and the printer arm moves the printer head within the widened bottom portion of the housing to position the printer head for depositing the drops of the printable food and the binder.

10. The food printer according to claim 9, wherein the housing comprises a rechargeable battery and contacts to recharge the battery.

11. The food printer according to claim 9 further comprising an RFID scanner coupled to the housing.

12. The food printer according to claim 9, wherein the housing includes a widened opening at a top.

13. The food printer according to claim 12 wherein each of said at least one reservoir is accessible through the widened opening at the top of the housing.

14. The food printer according to claim 1 wherein the control unit controls the movement of the printer arm and the printer head.

15. The food printer according to claim 1 wherein the control unit controls the drop that the printer head produces in every moment to create the 2- or 3-dimentional shape.

16. The food printer according to claim 9 wherein the control unit controls the movement of the printer arm and the printer head.

17. The food printer according to claim 9 wherein the control unit controls the drop that the printer head produces in every moment to create the 2- or 3-dimentional shape.

* * * * *